No. 878,014. PATENTED FEB. 4, 1908.
J. J. O'TOOLE.
PIPE.
APPLICATION FILED SEPT. 24, 1907.
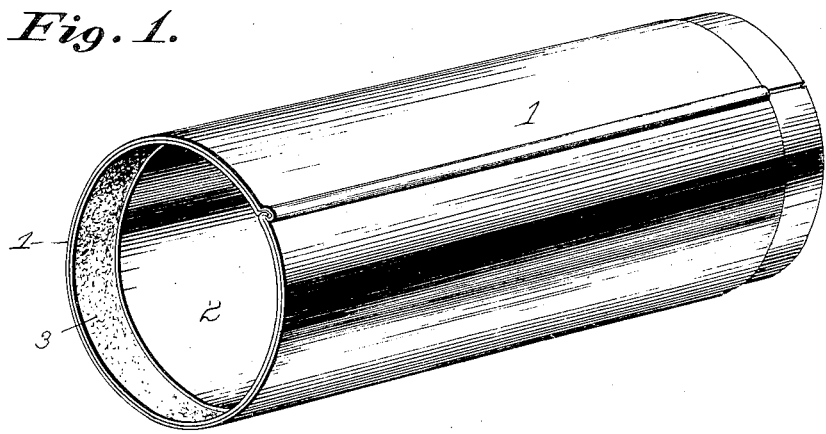
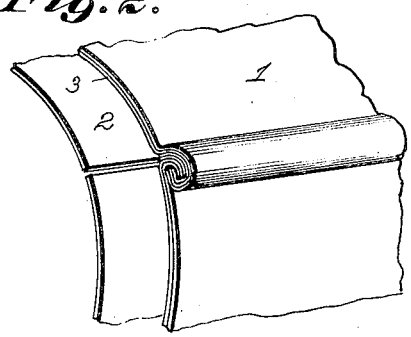
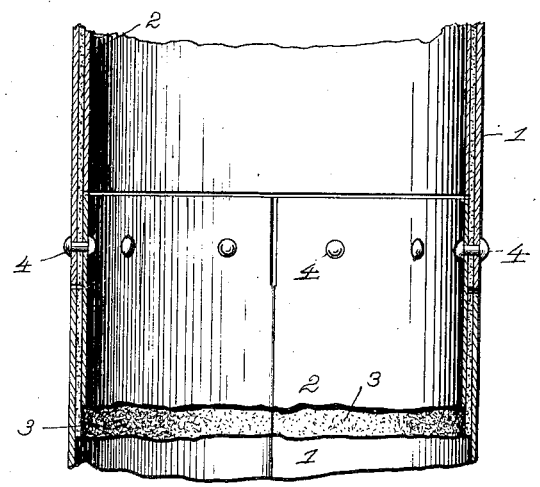
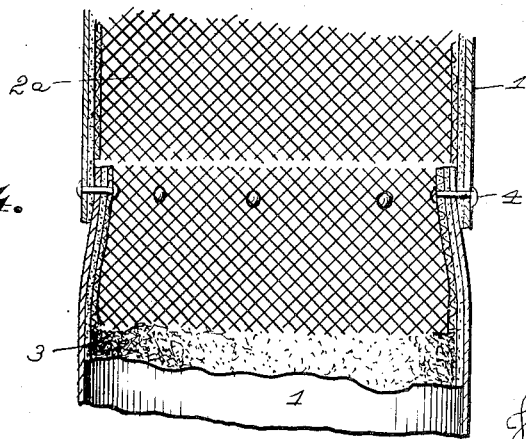
Witnesses
Harry O. Rastetter
Sylvia Boron
Inventor
John J. O'Toole
By F. W. Bond
Attorney

UNITED STATES PATENT OFFICE.

JOHN J. O'TOOLE, OF ALLIANCE, OHIO.

PIPE.

No. 878,014.   Specification of Letters Patent.   Patented Feb. 4, 1908.

Application filed September 24, 1907. Serial No. 394,284.

*To all whom it may concern:*

Be it known that I, JOHN J. O'TOOLE, a citizen of the United States, residing at Alliance, in the county of Stark and State of Ohio, have invented certain new and useful Improvements in Pipes; and I do hereby declare that the following is a full, clear, and exact description of the same, reference being had to the accompanying drawing, making a part of this specification, and to the numerals and figures of reference marked thereon, in which—

Figure 1 is a perspective view of a section of pipe. Fig. 2 is a view showing a portion of the pipe, showing the seam enlarged. Fig. 3 is a longitudinal section showing portions of two pipe sections joined together. Fig. 4 is a longitudinal section showing two portions of the pipe and illustrating a slight modification.

The present invention has relation to pipes more especially designed for hot air pipes or furnace pipes, or pipes, the use of which is to prevent the rapid escapement of heat, or the better confinement of heat during the time of the transmission of heat from the intake end of the pipe to the outlet or register end thereof.

Similar numerals of reference indicate corresponding parts in all the figures of the drawing.

In the accompanying drawing 1 represents the outer pipe and 2 the inner pipe, said pipes being concentrically located with reference to each other. Between the inner and outer pipes 1 and 2 is located a sheet of asbestos or other non-metallic and non-heat conducting material 3, said inner pipe being for the purpose of holding the non-metallic sheet 3 in proper contact with the inner surface of the outer pipe 1. The inner pipe 2 is formed of such a size with reference to the size of the outer pipe that it can be placed in proper position and in proper contact with the non-metallic sheet 3.

In order that the non-metallic sheet 3 be held in proper contact against the inner periphery of the outer pipe 1, the inner pipe is formed without a seam as illustrated in the drawings, and is so formed that it is free to come and go to compensate for any slight variation as to the size of the outer pipe.

For the purpose of connecting a number of pipe sections together the inner pipe section 2 is extended beyond one end of the outer pipe section 1 and the opposite end of said outer pipe section 1 extended beyond the end of the inner pipe 2, as best illustrated in Fig. 1. The object and purpose of arranging the pipe sections as shown is to provide means for inserting the extended portion of the inner pipe section into the adjacent end of the outer pipe section.

For the purpose of securely connecting or joining two pipe sections together, rivets 4 may be employed as desired. For the purpose of providing a continuous non-heat conducting surface or a continuous heat retaining surface the sheet of asbestos 3 or other heat retaining material is extended to the extreme end of the pipe section 1 so as to cause the adjacent ends of the sheets 3 to abut against each other when the pipe sections are connected together. In Fig. 4 I have illustrated a slight modification which consists in forming the inner pipe of coarse mesh gauze, which coarse mesh gauze is for the purpose of holding the asbestos sheets in proper contact with the inner surface of the outer pipe section 1. In the drawings I have illustrated the pipe formed circular in cross section, but I do not desire to be confined to this form nor do I desire to be confined to the specific use of hot air pipes as it will be understood that my improved pipe can be applied for any purpose without departing from the nature of my invention.

Having fully described my invention what I claim as new and desire to secure by Letters Patent, is—

1. A pipe for the purpose specified, consisting of two concentric pipes, the innermost one of said pipes having unconnected longitudinal edges, and an intermediate sheet of asbestos, substantially as and for the purpose specified.

2. A pipe for the purpose specified, consisting of inner and outer members, the outer member extended beyond the inner member and the inner member extended beyond the outer member at opposite ends of the pipe sections, said inner member having nonconnected longitudinal edges, and a sheet of asbestos located between said inner and outer members, substantially as and for the purpose specified.

3. As an improved article of manufacture, a pipe consisting of inner and outer pipe members, a non-metallic sheet located between and in contact with the inner and outer pipe members, said inner pipe member having disconnected longitudinal edges, substantially as and for the purpose specified.

In testimony that I claim the above, I have hereunto subscribed my name in the presence of two witnesses.

JOHN J. O'TOOLE.

Witnesses:
F. W. BOND,
SYLVIA BORON.